(12) United States Patent  (10) Patent No.: US 8,540,501 B2
Yasukochi                  (45) Date of Patent:     Sep. 24, 2013

(54) THREE-DIMENSIONAL STEREOLITHOGRAPHY APPARATUS, THREE-DIMENSIONAL STEREOLITHOGRAPHY METHOD, AND THREE-DIMENSIONAL OBJECT

(75) Inventor: Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 12/913,928

(22) Filed: Oct. 28, 2010

(65) Prior Publication Data

US 2011/0101569 A1 May 5, 2011

(30) Foreign Application Priority Data

Nov. 5, 2009 (JP) ................................. 2009-253948

(51) Int. Cl.
B28B 7/36 (2006.01)
(52) U.S. Cl.
USPC ............. 425/89; 425/374; 425/375; 425/440; 425/174.4; 264/316; 264/313
(58) Field of Classification Search
USPC ...... 264/401, 497, 316, 308, 313; 425/174.4, 425/89, 374, 375, 440
See application file for complete search history.

(56) References Cited

U.S. PATENT DOCUMENTS

| | | | | |
|---|---|---|---|---|
| 4,995,124 A | * | 2/1991 | Wridge et al. | 5/709 |
| 5,143,817 A | * | 9/1992 | Lawton et al. | 264/401 |
| 5,171,490 A | * | 12/1992 | Fudim | 264/401 |
| 5,192,559 A | * | 3/1993 | Hull et al. | 425/89 |
| 5,352,310 A | * | 10/1994 | Natter | 156/155 |
| 5,529,473 A | * | 6/1996 | Lawton et al. | 425/174.4 |
| 5,578,155 A | * | 11/1996 | Kawaguchi | 156/267 |
| 5,607,540 A | | 3/1997 | Onishi | |
| 5,611,880 A | | 3/1997 | Onishi | |
| 5,876,550 A | * | 3/1999 | Feygin et al. | 156/264 |
| 6,547,552 B1 | * | 4/2003 | Fudim | 425/174.4 |
| 7,402,219 B2 | * | 7/2008 | Graf | 156/89.11 |
| 2005/0248061 A1 | * | 11/2005 | Shkolnik et al. | 264/401 |
| 2006/0249884 A1 | * | 11/2006 | Partanen et al. | 264/401 |

FOREIGN PATENT DOCUMENTS

JP 07-084033 3/1995

* cited by examiner

Primary Examiner — Yogendra Gupta
Assistant Examiner — Ninh Le
(74) Attorney, Agent, or Firm — Dentons US LLP

(57) ABSTRACT

A three-dimensional stereolithography apparatus includes a stage, a support mechanism to support a film so that the film is opposed to the stage, a pressing mechanism, a supply mechanism, an irradiation unit, a movement mechanism, and a control mechanism. The pressing mechanism presses at least a linear area of the film so that the linear area closest to the stage is formed in the film. The supply mechanism supplies a light-curing material into a slit area formed between the stage and the linear area. The irradiation unit irradiates the light-curing material supplied into the slit area with laser light through the pressing mechanism and the film. The movement mechanism moves the stage and the pressing mechanism relatively to the film, to form one cured layer of the light-curing material. The control mechanism controls a distance between the stage and the linear area of the film, to stack the cured layer.

14 Claims, 10 Drawing Sheets

THREE-DIMENSIONAL STEREOLITHOGRAPHY APPARATUS, THREE-DIMENSIONAL STEREOLITHOGRAPHY METHOD, AND THREE-DIMENSIONAL OBJECT

BACKGROUND OF THE INVENTION

1. Field of the Invention

The present invention relates to a three-dimensional stereolithography apparatus that forms a three-dimensional object from a light-curing material, a three-dimensional stereolithography method, and a three-dimensional object formed by a three-dimensional stereolithography method.

2. Description of the Related Art

From the past, a modeling apparatus that forms a three-dimensional object is known as an apparatus that performs so-called rapid prototyping and is widespread for commercial use. Generally, a three-dimensional modeling apparatus models a three-dimensional object by forming layers one by one based on shape data for each predetermined thickness of a target object to be modeled, that is, based on shape data of each layer.

As a main system of a three-dimensional modeling apparatus, a stereolithography system partially selectively irradiates a light-curing resin with laser light, and thus cures and traces a desired part of the resin, thereby forming a three-dimensional object.

The stereolithography system includes a free liquid level method and a restricted liquid level method, for example. In the free liquid level method, the liquid level of a light-curing resin is exposed to air, and laser light is focused on an interface between air and the liquid level, thereby making a tracing. The free liquid level method has a problem in that layering accuracy (accuracy of a thickness for each layer or accuracy of a surface condition of a resin for each layer) of a resin varies depending on surface accuracy of a liquid level. In view of this, in a restricted surface level method, the liquid level of a light-curing resin is restricted by a flat glass surface, and laser light is focused on an interface between the liquid level and the glass surface through the glass, thereby making a tracing (see, for example, Japanese Examined Patent Publication No. H7-84033, paragraph 0018 (hereinafter, referred to as Patent Document 1)). In Patent Document 1, a film is used as a member that restricts a liquid level.

SUMMARY OF THE INVENTION

In the restricted liquid level method using glass or a film, it is necessary to peel off a cured resin from the glass after layers are modeled. In this method, as the modeled areas of the layers are larger, a larger force is necessary for peeling off the cured resin. In some cases, a three-dimensional object modeled may be broken down or may be peeled from a table (stage on which the modeled layers are stacked).

Further, if the modeled areas of the layers are increased as described above, the glass may be distorted due to a contraction force that is generated when the resin is cured, or may sag by being pulled toward the resin. As a result, the flatness of each layer of the three-dimensional object modeled may be degraded.

In addition, as the viscosity of the light-curing resin becomes higher, a pressure given to the surface of the table or the glass surface by the resin is increased, with the result that the glass surface is distorted, and the thickness of each layer of the resin is difficult to be controlled to be a preset thickness.

In view of the above-mentioned circumstances, it is desirable to provide a three-dimensional stereolithography apparatus and a three-dimensional stereolithography method capable of peeling off a light-curing material from a film, increasing the flatness of each layer, and controlling the thickness of each layer with high accuracy, and provide a three-dimensional object formed by the method.

According to an embodiment of the present invention, there is provided a three-dimensional stereolithography apparatus including a stage, a support mechanism, a pressing mechanism, a supply mechanism, an irradiation unit, a movement mechanism, and a control mechanism.

The support mechanism supports a film so that the film is opposed to the stage.

The pressing mechanism presses at least a linear area of the film supported by the support mechanism so that the linear area that is opposed to and closest to the stage is formed in the film. The linear area is formed in a first direction.

The supply mechanism supplies a light-curing material into a slit area formed between the stage and the linear area of the film.

The irradiation unit irradiates the light-curing material supplied into the slit area by the supply mechanism with laser light through the pressing mechanism and the film.

The movement mechanism moves the stage and the pressing mechanism relatively to the film in a second direction, to form one cured layer of the light-curing material. The second direction is different from the first direction.

The control mechanism controls a distance between the stage and the linear area of the film, to stack the cured layer of the light-curing material with the laser light.

By the pressing mechanism, the linear area closest to the stage is formed in the film. The light-curing material is exposed and cured in the slit area formed between the linear area and the stage or in the vicinity of the slit area. That is, the light-curing material is cured substantially in the slit area between the stage and the linear area, and the film is moved relatively to the pressing mechanism on the downstream side of the linear area of the film so that the film is gradually distanced from the stage. As a result, the film can be neatly peeled off from the cured layer of the resin.

Further, not a broad, flat area, but the linear area is pressed to give a tension to the film, so the film is brought into close contact with the pressing mechanism. Therefore, even if a contraction force generated when the light-curing material is cured is given to the film, deformation such as a winkle and sag is prevented from being caused in the film, and deformation of the film due to the viscosity of a light-curing resin before the exposure can also be prevented. As a result, the flatness of each cured layer is increased, and the thickness of each cured layer can be controlled with high accuracy.

The linear area may be one dimensional or two dimensional. In the case where the linear area is two dimensional, the linear area may be a flat area or a curved area. In the case where the linear area is the curved area, the area is substantially the flat area microscopically.

The pressing mechanism may press the film so that a curved area including the linear area is formed in the film. With this structure, a friction force generated between the film and the pressing mechanism can be reduced.

The pressing mechanism may include a light-transmissive member having a curved surface corresponding to a shape of the curved area. In this case, the light-transmissive member may be a rod lens.

The rod lens may be provided rotatably about an axis extended in the first direction. With this structure, it is possible to prevent the film and the pressing mechanism from being scraped on each other. Thus, it is possible to suppress the deterioration of the pressing mechanism or the generation of a winkle or flaw in the curved area of the film.

The three-dimensional stereolithography apparatus may further includes a correction lens to correct a shape of a beam spot of the laser light with which the light-curing material is irradiated. When a laser beam passes through the rod lens, the shape of the beam spot is distorted. In the case where it is necessary to form a three-dimensional object with high accuracy, the correction lens corrects the shape of the beam spot into a desired shape, with the result that the resolution of the exposure can be increased.

The light-transmissive member may be a cylindrical lens having a cylindrical surface as the curved surface. The cylindrical lens can be set to be thinner in a light axis direction than a rod lens, so a numerical aperture (NA) can be increased. Thus, the spot diameter of the laser beam can be reduced, and the resolution of the exposure is increased, with the result that the three-dimensional object can be formed with high accuracy.

The pressing mechanism may include a support member that supports the light-transmissive member. In this case, the support member may include a curved surface and a flow path. The curved surface is provided in continuous with the curved surface of the light-transmissive member, to form the curved area. The flow path introduces a gas into a gap between the film and the curved surfaces of the light-transmissive member and the support member. The gas introduced functions as a cushion, which can reduce the friction force between the film and the pressing mechanism.

The pressing mechanism may press the film so that a flat area including the linear area and a curved area provided in continuous with the flat area are formed on the film. Since the area including the linear area is flat, the flatness of each cured layer of the light-curing material can be increased as compared to the case where the area is curved.

The pressing mechanism may include an optical path of the laser light, a slit, and a curved surface. In this case, the slit has an opening surface corresponding to a shape of the flat area, and the optical path is formed in the slit. The curved surface is provided in continuous with the opening surface, and corresponds to a shape of the curved area. In this embodiment, the laser light passes through the slit, and the light-curing material is irradiated with the laser light. That is, since the laser light does not pass through a lens, refraction of the laser light is not caused. Thus, the shape of the spot of the laser light that exits the objective lens is not changed, which can increase the resolution of the exposure.

The pressing mechanism may further include a flow path that introduces a gas into a gap between the film and the opening surface and curved surface. The gas introduced functions as a cushion, which can reduce the friction force between the film and the pressing mechanism.

The three-dimensional stereolithography apparatus may further include a pressure control mechanism to control a pressure in the slit. The pressure control mechanism controls the pressure in the slit in accordance with the contraction force generated when the light-curing material is cured or the viscosity thereof, with the result that the flatness of each cured layer of the light-curing material can be controlled.

The three-dimensional stereolithography apparatus may further include a scanning mechanism to perform relative scanning with respect to the pressing mechanism and the stage with the laser light in the first direction.

The movement mechanism may integrally move the stage and the film relatively to the pressing mechanism. With the structure in which the stage and the film are integrally moved, the structure of the movement mechanism can be simplified as compared to the structure in which the stage and the film are independently moved.

According to another embodiment of the present invention, there is provided a three-dimensional stereolithography method that includes pressing, by a pressing mechanism, at least a linear area of a film supported to be opposed to a stage, so that the linear area that is opposed to and closest to the stage is formed in the film. The linear area is formed in a first direction.

A light-curing material is supplied into a slit area formed between the stage and the linear area of the film.

The light-curing material supplied into the slit area is irradiated with laser light through the pressing mechanism and the film.

The stage and the pressing mechanism are moved relatively to the film in a second direction, to form one cured layer of the light-curing material. The second direction is different from the first direction.

A distance between the stage and the linear area of the film is controlled to stack the cured layer of the light-curing material with the laser light.

According to another embodiment of the present invention, there is provided a three-dimensional object formed by the three-dimensional stereolithography method described above.

As described above, according to the embodiments of the present invention, the resin can be neatly peeled off from the film forming a restricted surface, and the flatness of each layer is increased, with the result that the thickness of each layer can be controlled with high accuracy.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(First Embodiment)

Structure of Three-Dimensional Stereolithography Apparatus

Figure 1:
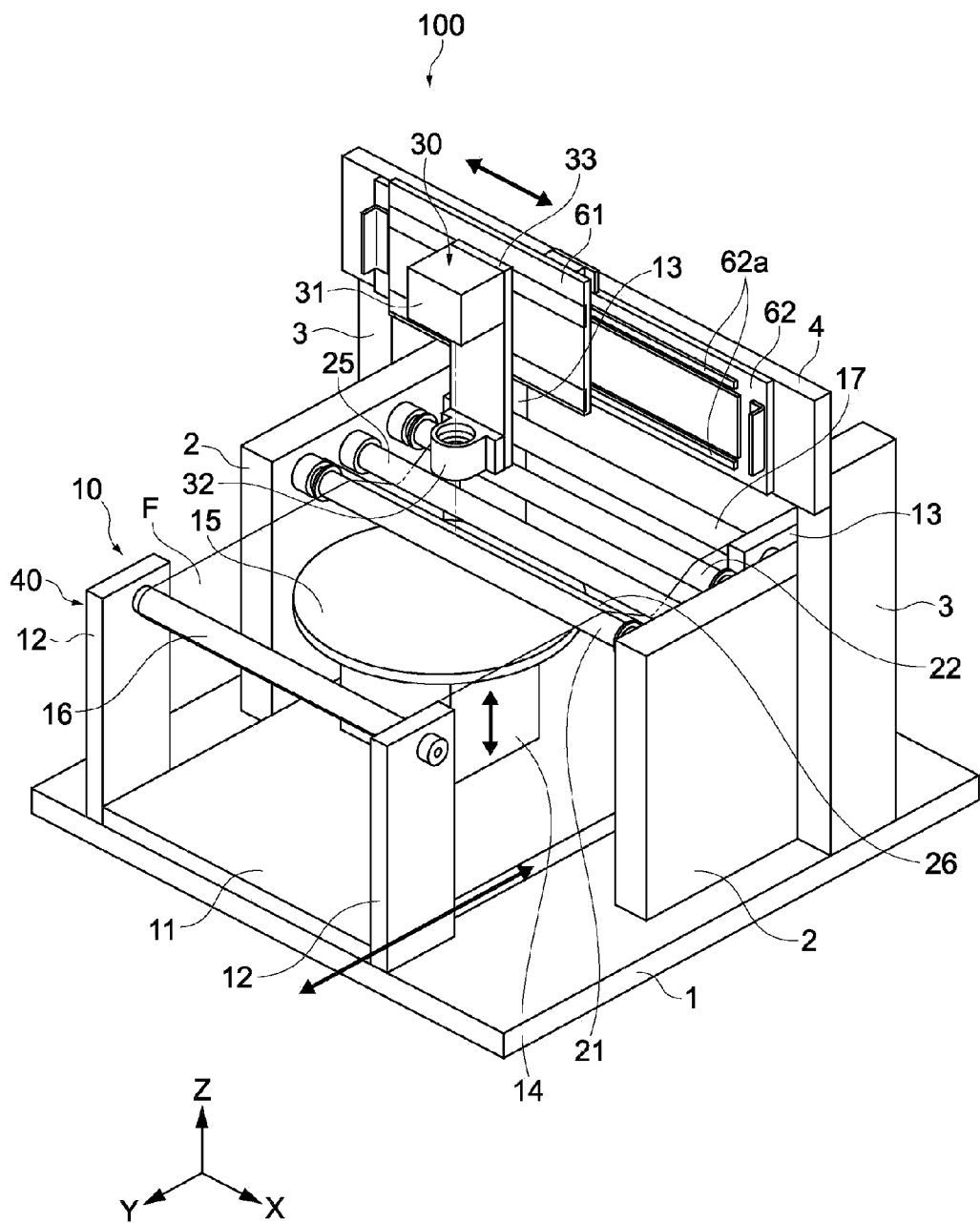
FIG. 1 is a perspective view showing a three-dimensional stereolithography apparatus according to a first embodiment of the present invention.

FIG. 1 is a perspective view showing a three-dimensional (hereinafter, abbreviated to 3-D) stereolithography apparatus according to a first embodiment of the present invention.

A 3-D stereolithography apparatus 100 includes a base 1, two sidewalls 2, and a stage mechanism 10. The sidewalls 2 are vertically provided on a backward area of the base 1, and the stage mechanism 10 is disposed between the sidewalls 2.

Figure 2:
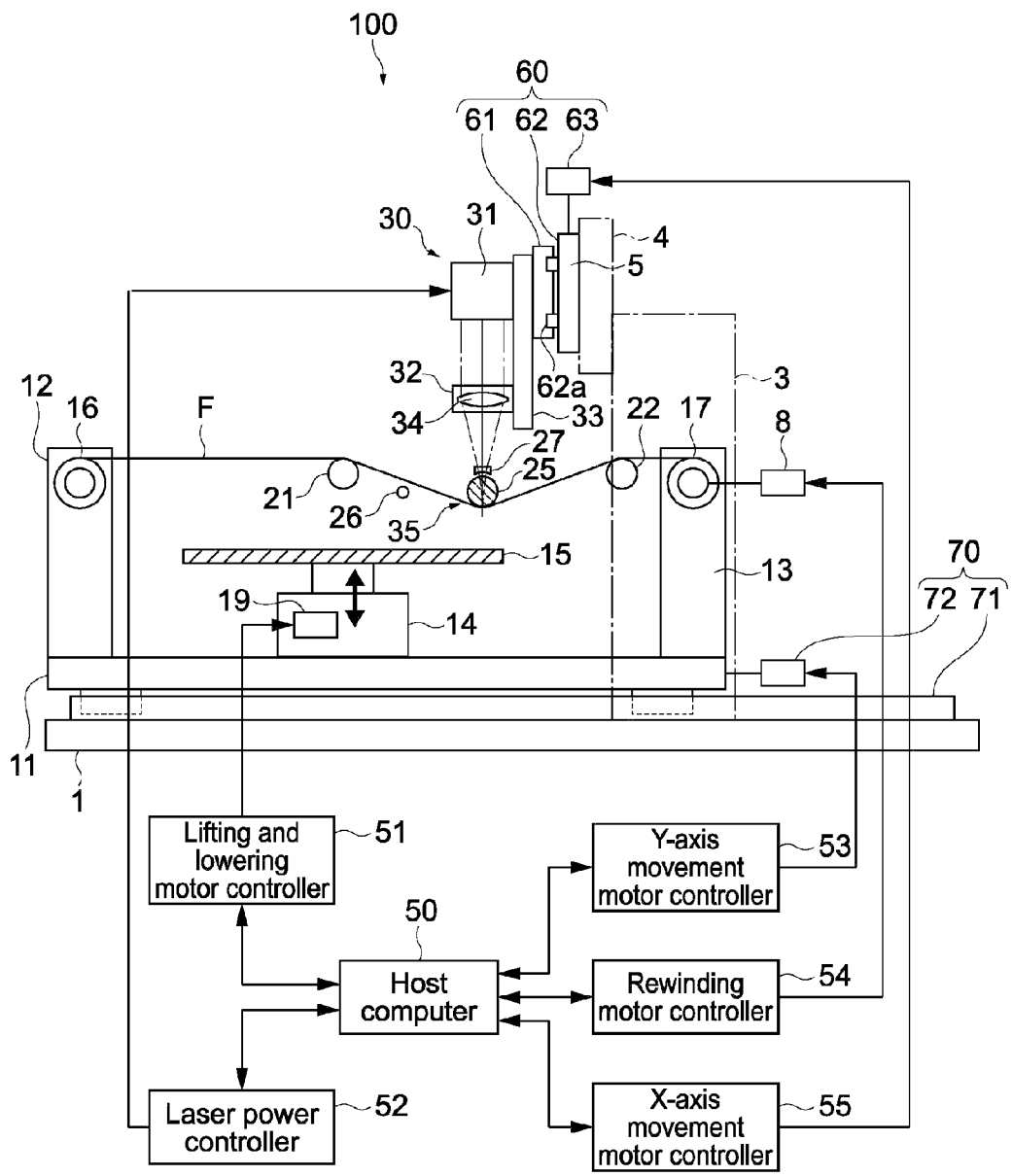
FIG. 2 is a schematic side view showing the three-dimensional stereolithography apparatus shown in FIG. 1 and a block diagram showing the structure of a control system thereof.

FIG. 2 is a schematic side view showing the 3-D stereolithography apparatus 100 and a block diagram showing the structure of a control system thereof.

The stage mechanism 10 includes a modeling stage 15 and a film support mechanism 40. On the modeling stage 15, a 3-D object is formed by stacking modeled layers. The film support mechanism 40 supports a film F so that the film F faces the modeling stage 15. Further, the stage mechanism 10 includes a movement base 11 and a Y-axis movement mechanism 70. The movement base 11 supports and integrally moves the modeling stage 15 and the film support mechanism 40. The Y-axis movement mechanism 70 moves the movement base 11 in a Y-axis direction. The Y-axis movement mechanism 70 includes a Y-axis movement motor 72 and a guide rail 71 that guides the movement of the movement base 11. The guide rail 71 is provided on the base 11 along the Y-axis direction.

The film support mechanism 40 includes a supplying reel 16 and a rewinding reel 17. The film F is wound around the supplying reel 16, and the supplying reel 16 supplies the film F. The rewinding reel 17 rewinds the film F supplied from the supplying reel 16. The rewinding reel 17 is disposed substantially at the same level as the supplying reel 16. The supplying reel 16 is rotatably supported between two column members 12 vertically provided on the forward area of the movement base 11. Similarly, the rewinding reel 17 is rotatably supported between two column members 13 vertically provided on the backward area of the movement base 11.

For example, the rewinding reel 17 is driven by a rewinding motor 8, and the supplying reel 16 is a driven reel. At the time when a 3-D object is formed on the modeling stage 15, the movement base 11 is intermittently moved at predetermined pitches in the Y-axis direction. During the movement, the rewinding reel 17 is not driven, and the film F is fixed with respect to the movement base 11.

As the film F, a light-transmissive material such as polycarbonate, polyethylene, and polyvinyl chloride is used. The film F, the surface of which is subjected to a hard coating process, may be used in order to easily peel off the film F from a light-curing material R that is a material of the 3-D object.

Further, between the sidewalls 2, an inlet guide roller 21 and an outlet guide roller 22 are arranged in the Y-axis direction substantially at the same level as the supplying reel 16 and the rewinding reel 17 of the film support mechanism 40. The inlet guide roller 21 and the outlet guide roller 22 guide the movement of the film F. The inlet guide roller 21 and the outlet guide roller 22 each have a shape elongated in an X-axis direction, and are rotatably supported by the sidewalls 2.

Between the sidewalls 2 and between the inlet guide roller 21 and the outlet guide roller 22 in the Y-axis direction, a pressing mechanism 35 is disposed. The pressing mechanism 35 gives a tension to the film F by pressing the film F supported by the film support mechanism 40 toward the modeling stage 15. As the pressing mechanism 35, used is a rod lens 25 that is a light-transmissive material having a curved surface, for example. The rod lens 25 has a columnar shape that is elongated in the X-axis direction, and is rotatably supported by the sidewalls 2.

To press the film F toward the modeling stage 15 by the rod lens 25, the height of a contact area between the rod lens 25 and the film F is set to be different from the height of a contact area between the inlet guide roller 21 (and the outlet guide roller 22) and the film F, specifically, set to be lower than the height thereof. With this structure, the rod lens 25 forms a linear area A1 (see, FIG. 5) along the X-axis direction, which is closest to the modeling stage 15, on the film F by pressing the linear area A1 of the film F. As a result, a slit area S (see, FIG. 5) is formed between the modeling stage 15 and the linear area A1 of the film F. To the slit area S, the light-curing material R is supplied through the film F as will be described later.

Figure 5:
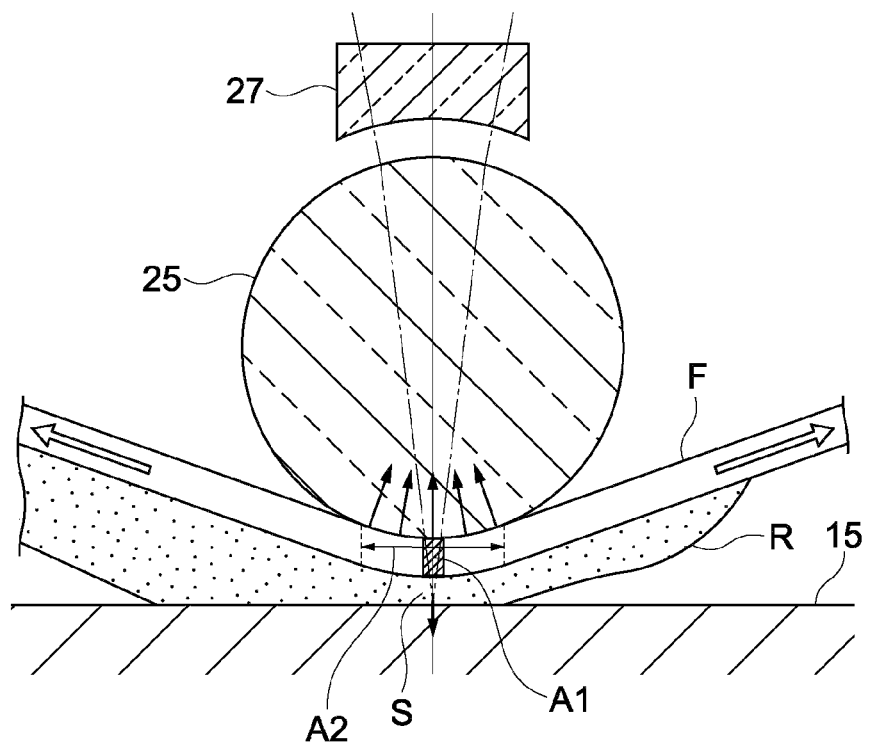
FIG. 5 is an enlarged view showing the state of a slit area and the vicinity thereof.

Thus, as shown in FIG. 5, the rod lens 25 presses the film F, thereby forming a curved area A2 including the linear area A1 in the film F.

Between the sidewalls 2, a supplying nozzle 26 is provided as a supply mechanism that supplies the light-curing material R to the film F. The supplying nozzle 26 has a shape elongated in the X-axis direction. As shown in FIG. 2, the supplying nozzle 26 is provided between the inlet guide roller 21 and the rod lens 25 and between the modeling stage 15 and the film F in the state of being supported by the film support mechanism 40 and being subjected to the tension by the rod lens 25. The supplying nozzle 26 has a slit or a plurality of holes (not shown) along a longitudinal direction thereof for discharging the light-curing material R. The slit or the plurality of holes is opened with respect to the side where the film F is disposed.

It should be noted that a pump, a tube, an opening and closing valve, and the like (not shown) for introducing the light-curing material R to the supplying nozzle 26 are connected to the supplying nozzle 26, for example.

As shown in FIG. 1, the stage mechanism 10 includes a lifting and lowering mechanism (part or whole of a control mechanism) 14 that supports the modeling stage 15 and lifts and lowers the modeling stage 15 to and from the movement base 11. The lifting and lowering mechanism 14 lifts and lowers the modeling stage 15 using a lifting and lowering motor 19, thereby controlling the distance between the modeling stage 15 and the linear area A1 of the film F. The uppermost position of the modeling stage 15 lifted by the lifting and lowering mechanism 14 is a position at which the film F in contact with the rod lens 25 is disposed. The modeling stage 15 has a circular shape in a horizontal plane (in an X-Y plane). However, the shape of the modeling stage 15 is not limited to the circular shape, and may be a rectangular shape or another shape. Typically, as the light-curing material R, a UV-curing resin is used.

As shown in FIG. 1, the 3-D stereolithography apparatus 100 includes an irradiation unit 30 that irradiates the light-curing material R supplied from the supplying nozzle 26 with laser light. On the backward side of the 3-D stereolithography apparatus 100, two support columns 3 are vertically provided on the base 1. Between the two support columns 3, a beam member 4 is extended. As shown in FIG. 2, the irradiation unit 30 is movable in the X-axis direction by an X-axis movement mechanism 60 provided to the beam member 4. The X-axis movement mechanism 60 includes an X-axis movement motor 63, a rail plate 62, and a movable plate 61. The rail plate 62 has a guide rail 62a fixed to the beam member 4. The movable plate 61 is movably attached to the rail plate 62. The X-axis movement mechanism 60 functions as a scanning mechanism that performs scanning with laser light in the X-axis direction.

The irradiation unit 30 is fixed to the movable plate 61, and includes a laser light source 31, an objective lens holder 32, an objective lens 34 (see, FIGS. 2 and 6), and a fixation plate 33. The objective lens holder 32 is disposed immediately below the laser light source 31. The objective lens 34 is held by the objective lens holder 32. The fixation plate 33 supports the laser light source 31 and the objective lens holder 32 and fixes those members to the movable plate 61. The irradiation unit 30 is disposed in a position so as to irradiate the light-curing material R.

The irradiation unit 30 narrows a spot diameter of a laser beam emitted from the laser light source 31 by using the objective lens 34, and focuses on the slit area S or the light-curing material R in or in the vicinity of the slit area S through the rod lens 25 and the film F. That is, typically, the objective lens 34 is disposed on an optical axis so that a focal point of the laser light falls on the light-curing material R in at least the slit area S.

Between the objective lens 34 and the rod lens 25, a correction lens 27 is disposed on the optical axis. The correction lens 27 corrects, into a desired shape, the shape of a beam spot of the laser light with which the light-curing material R is irradiated. Thus, a resolution of exposure light can be increased. However, in the case where the accuracy of the shape of the 3-D object is not so necessary, the correction lens 27 does not have to be provided. It should be noted that the correction lens 27 may be held by a lens holder (not shown).

In the 3-D stereolithography apparatus 100 structured as described above, the film F, the modeling stage 15, and the movement base 11 are moved integrally in the Y-axis direction with respect to the inlet guide roller 21, the outlet guide roller 22, the supplying nozzle 26, the rod lens 25, and the irradiation unit 30. In this way, by integrally moving the modeling stage 15 and the film F, the Y-axis movement mechanism 70 can be implemented with a simple structure as compared to the structure in which those components are individually moved.

The lifting and lowering mechanism 14, the Y-axis movement mechanism 70, and the X-axis movement mechanism 60 shown in FIG. 2 can be implemented by a ball screw drive mechanism, a rack-and-pinion drive mechanism, a belt drive mechanism, a fluid pressure cylinder drive mechanism, or the like.

In addition, the 3-D stereolithography apparatus 100 includes a lifting and lowering motor controller 51, a rewinding motor controller 54, an Y-axis movement motor controller 53, and an X-axis movement motor controller 55 that control the drives of the lifting and lowering motor 19, the rewinding motor 8, the Y-axis movement motor 72, and the X-axis movement motor 63, respectively. The 3-D stereolithography apparatus 100 further includes a laser power controller 52 that controls the power of laser light that is emitted from the laser light source 31. The operations of those controllers are subjected to overall control by a host computer 50. The 3-D stereolithography apparatus 100 also includes a controller (not shown) for driving the pump or the opening and closing valve connected to the supplying nozzle 26.

The controllers described above are each provided with a CPU (central processing unit), a RAM (random access memory), a ROM (read only memory), and the like. Instead of the CPU, a DSP (digital signal processor), an FPGA (field programmable gate array), an ASIC (application specific integrated circuit), or the like may be used. Typically, those controllers are connected with each other in a wired manner. However, at least one of the controllers may be connected to a control system in the 3-D stereolithography apparatus 100 wirelessly.

(Operation of 3-D Stereolithography Apparatus)

Figure 3A:
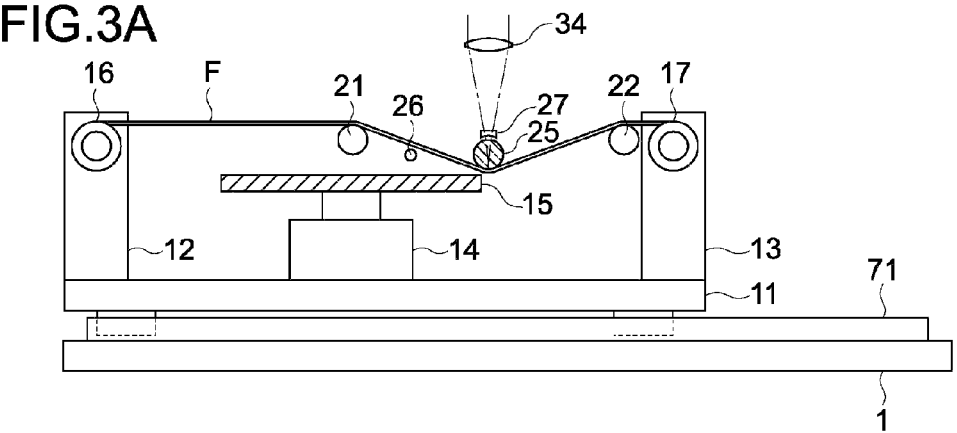
FIG. 3 are schematic side views for explaining operations of the three-dimensional stereolithography apparatus.
Figure 3B:
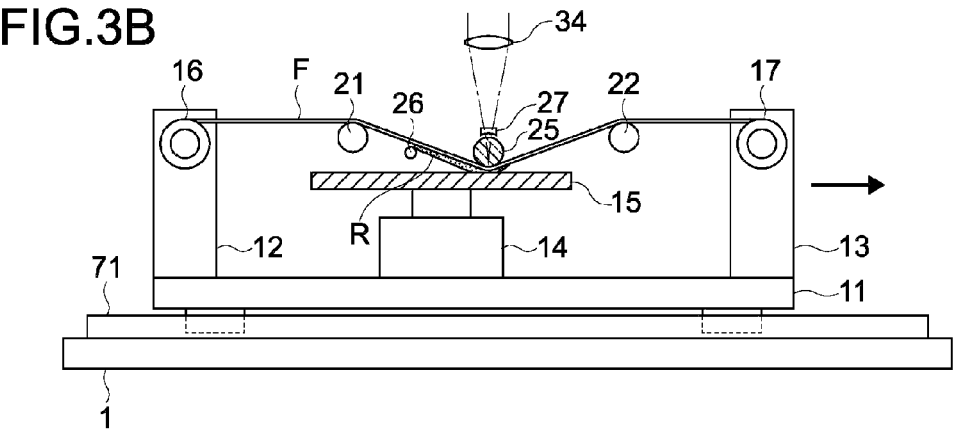
Figure 3C:
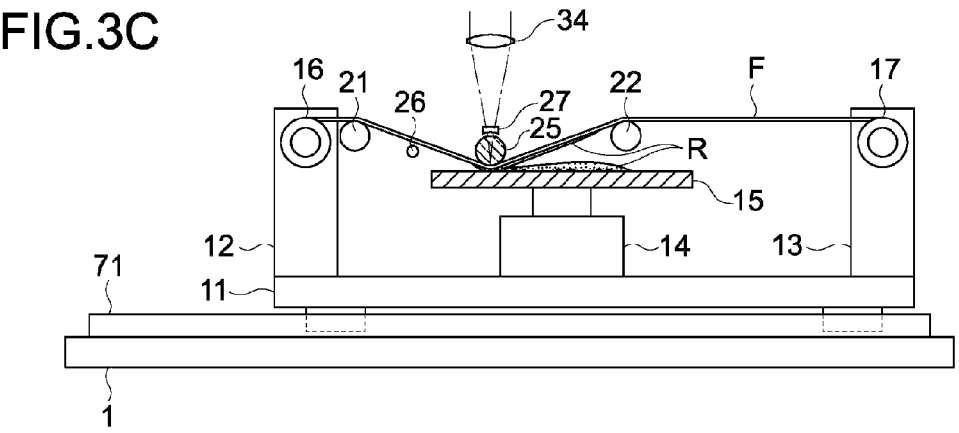

Next, the operation of the 3-D stereolithography apparatus 100 structured as described above will be described. FIGS. 3A to 3C are diagrams showing the operation in order.

FIG. 3A shows a state where the 3-D stereolithography apparatus 100 is stopped and a state where the movement base 11 is set at an initial position. Before actually performing modeling, a thickness of one cured layer that is made of the light-curing material R is set through the host computer. Then, for example, by driving the lifting and lowering mechanism 14 under the control of the lifting and lowering motor controller 51, the modeling stage 15 is lifted up to the height of the film F pressed by the rod lens 25. The height of the modeling stage 15 at the time when the modeling stage 15 is brought into contact with the film F is set as an original point in a Z-axis direction.

It should be noted that a position of the modeling stage 15 in the Y-axis direction at the time of setting the original point can be set as appropriate.

When the original point is set, the modeling stage 15 is lowered by a distance corresponding to the preset thickness of the one layer of the light-curing material R.

After the modeling stage 15 is lowered, the Y-axis movement mechanism 70 moves the modeling stage 15 to a modeling start position that is a predetermined position as shown in FIG. 3B. The modeling start position refers to a position of the modeling stage 15 along the Y-axis direction, where the slit area S can be formed between the modeling stage 15 and the linear area A1 formed in the film F by the rod lens 25. The setting of the modeling start position can be changed when necessary based on the size of a 3-D object in the Y-axis direction that is to be formed, as long as the modeling stage 15 is set so that the slit area S can be formed.

When the modeling stage 15 is set at the modeling start position, the light-curing material R is supplied from the supplying nozzle 26 to the lower surface side of the film F. As described above, as the light-curing material R, a UV-curing resin is used, for example. Hereinafter, the UV-curing resin is referred to as a resin liquid R for convenience.

When the resin liquid R is transferred onto the film F as described above, the resin liquid R is transmitted along the film F by self-weight, for example. As a result, the resin liquid R fills up an interspace between the lower surface of the film F and the surface of the modeling stage 15, including the slit area S. FIG. 5 shows the state of the slit area S and the vicinity thereof in this case in an enlarged manner. In this state, the irradiation of the resin liquid R with the laser light, that is, the exposure is started.

While moving in the X-axis direction under the control of the X-axis movement motor controller 55, the irradiation unit 30 performs selective exposure on the resin liquid R based on data of one column in the X-axis direction in the one layer of a modeling target object based on the control of the laser power controller 52. Specifically, the laser power controller 52 generates a modulation signal of laser power in accordance with the data of the one column and transmits the modulation signal thus generated to the laser light source 31, thereby performing the selective exposure on the resin liquid R of the one column in the X-axis direction in the one layer and curing the resin liquid R. The resin liquid R in at least the slit area S is subjected to the exposure, that is, the resin liquid R in or in the vicinity of the slit area S is subjected to the exposure.

As the laser light, light having a UV wavelength range is used. The thickness of the one layer of the 3-D object is set to 1 to 100 μm, but is not limited to this. The thickness can be set as appropriate.

When the exposure on the resin liquid R is terminated for the one column, the irradiation with the laser light is stopped, and the Y-axis movement mechanism 70 moves the modeling stage 15 forwards (leftwards in FIG. 3B) in the Y-axis direction at a predetermined pitch. Then, in the same way as above, the selective exposure is performed on the next column (one column adjacent to the column that has previously subjected to the exposure) in the one layer mentioned above.

The 3-D stereolithography apparatus 100 repeatedly performs the operation described above, with the result that the selectively cured layer of the resin liquid R by the one layer, that is, the one layer of the 3-D object is formed as shown in FIG. 3C. In this way, the exposure process of the one layer is performed in a so-called raster scanning. The intermittent movement pitch of the modeling stage 15 in the Y-axis direction can be set as appropriate depending on the spot diameter of the laser beam, that is, a resolution at the time of forming the 3-D object.

Figure 6:
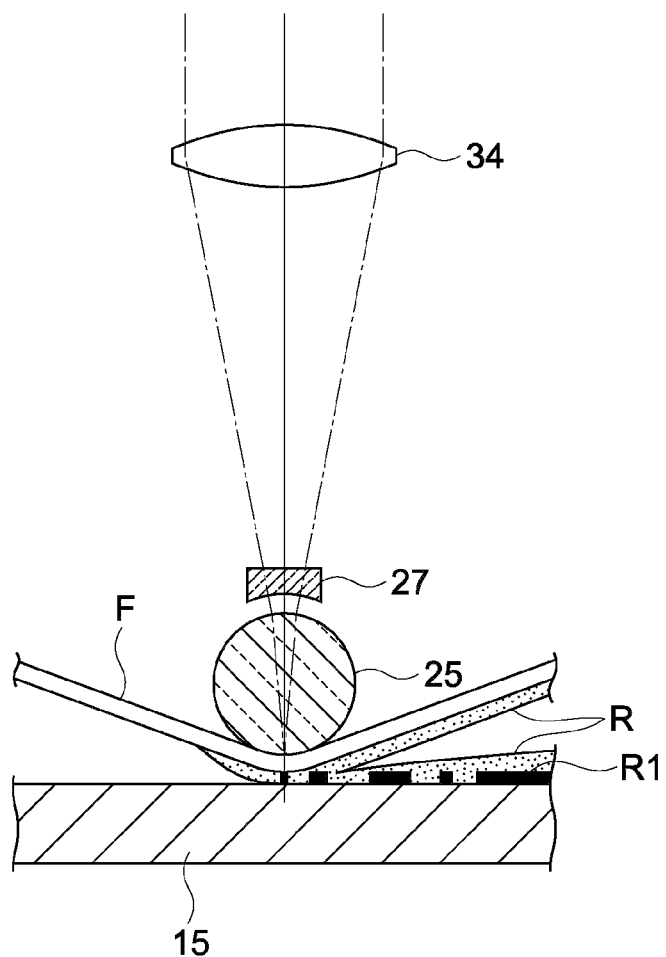
FIG. 6 is an enlarged view showing a resin liquid and a cured layer on a modeling stage that are shown in FIG. 3C.

FIG. 6 is an enlarged diagram showing the cured layer and the resin liquid R on the modeling stage 15 shown in FIG. 3C. In FIG. 6, one cured layer R1 is indicated by being blacked. As shown in FIG. 6, on the right side, that is, on the downstream side from the rod lens 25, the resin liquid R that is not cured is adhered to the film F and to the one cured layer R1 formed, which is not a problem. This will be described later.

Here, at the time when the modeling stage 15 (and the movement base 11) is moved in the Y-axis direction by the Y-axis movement mechanism 70, the rewinding reel 17 remains still, and the film F remains still with respect to the modeling stage 15 (and the movement base 11). Therefore, at the time when the modeling stage 15 (and the movement base 11) is moved in the Y-axis direction, the rod lens 25 is rotated due to a friction force generated between the film F and the rod lens 25. Thus, it is possible to prevent the film F and the rod lens 25 from being scraped on each other, with the result that it is possible to suppress deterioration of the rod lens 25 or generation of a wrinkle or flaw on the curved area A2 of the film F.

In addition, at the time when the exposure on the one column of the resin liquid R is terminated and when the modeling stage 15 is moved at the predetermined one pitch, on the downstream side (right side from the slit area S in FIG. 5, for example) from the slit area S, the modeling stage 15 is moved so that the film F is set apart from the modeling stage 15 in the Z-axis direction. As a result, the film F can be neatly peeled off from the cured layer R1 of the resin.

Further, as shown in FIG. 5, in the curved area A2 of the film F, a force is applied to the curved surface of the rod lens 25 from the film F in the normal direction, to cause the film F to be closely adhered to the rod lens 25. Therefore, even if a contraction force generated when the resin liquid R is cured is applied to the film F, deformation such as the wrinkle or sag of the film F does not occur, and deformation of the film F due to the viscosity of the resin liquid R before the exposure can be prevented. As a result, the flatness of the cured layer R1 is increased, and the thickness thereof can be controlled with high accuracy.

Upon completion of the exposure on the one layer of the resin liquid R, the modeling stage 15 is lowered by a distance corresponding to the thickness of the one cured layer R1. Then, the movement base 11 and the modeling stage 15 are returned to the modeling start position shown in FIG. 3B from the position shown in FIG. 3C. In this case, the movement base 11 and the modeling stage 15 may be returned to the modeling start position during the lowering of the modeling stage 15.

After that, the film F is rewound by the rewinding reel 17 by a predetermined length, and a new film F is disposed so as to be pressed by the rod lens 25. Thus, even in the case where a flaw is caused in the film F in the modeling process of a first layer, it is possible to form the 3-D object with high accuracy without adversely affecting the control on the thickness of the cured layer R1 in the modeling process of the next (second) layer by supplying the new film F to the rod lens 25 for each layer. However, in the case where a user does not demand the accuracy of the shape of the 3-D object, the same film F may be used in the modeling process of a plurality of layers.

In the modeling process of the second layer, the resin liquid R that is not cured and remains on the cured layer R1 is subjected to the exposure by the same operation as in the case of the first layer, thereby forming the cured layer R1 of the second layer. In this way, the resin liquid R is periodically replenished and supplied to the film F while the layers are stacked in the Z-axis direction to form the 3-D object.

Of course, the resin liquid R may be replenished every modeling process for one layer, at shorter intervals, or at all time.

Figure 4A:
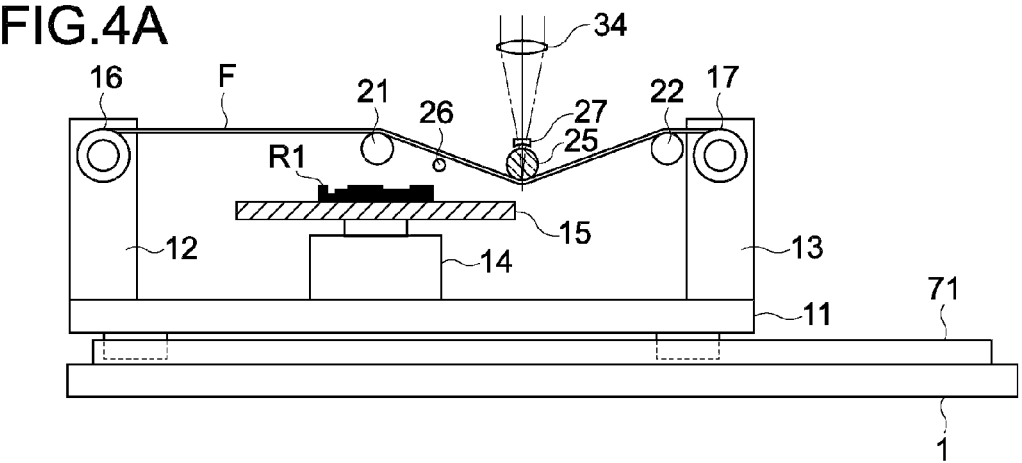
FIG. 4 are schematic side views for explaining operations of the three-dimensional stereolithography apparatus.
Figure 4B:
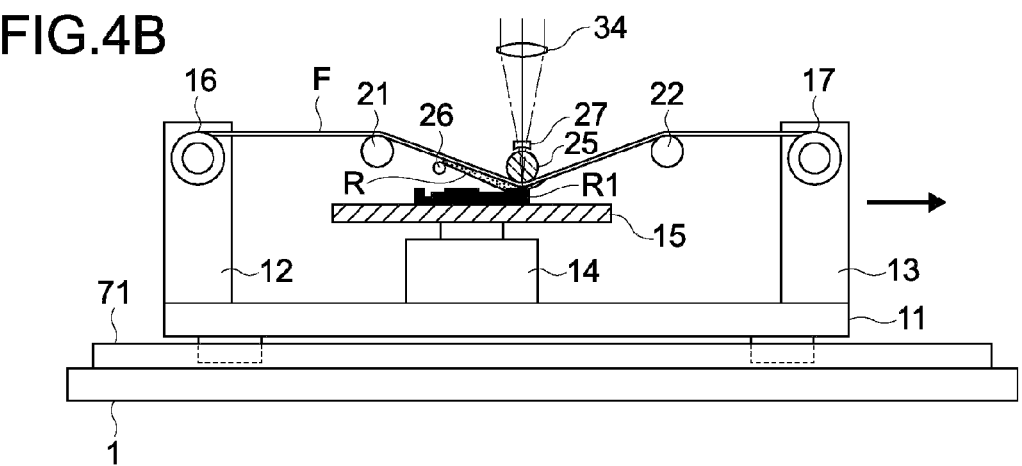
Figure 4C:
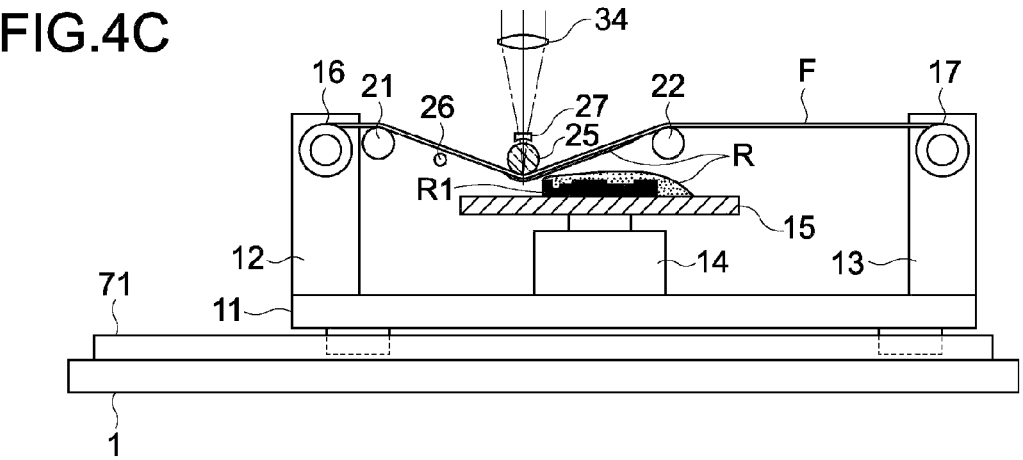

In the state where the 3-D object of the layers having an arbitrary thickness is already formed as described above, as shown in FIGS. 4A to 4C, one cured layer R1 is further formed on the formed 3-D object by the same operation as the operation shown in FIG. 3.

As described above, in this embodiment, it is possible to maintain the thickness of each layer of the 3-D object to be accurately constant. As a result, the flatness of the cured layer R1 for each layer can be improved.

In the restricted liquid level method in related art, it takes time to peel off a 3-D object from a film. However, in this embodiment, the 3-D object is peeled off from the film when the modeling stage 15 is moved stepwise in the Y-axis direction at the time of exposure process. That is, a time period for the exposure process and a time period for the peeling process are overlapped, which can reduce a time period necessary for forming the 3-D object.

In this embodiment, the film F that is in contact with the rod lens 25 can withstand the contraction force of the cured layer R1 or the viscosity of the resin liquid R, which can expand the range of options of the light-curing material.

(Second Embodiment)

In the 3-D stereolithography apparatus 100 according to the first embodiment, the rod lens 25 is used for the pressing mechanism 35. In the following, four embodiments will be described as to a pressing mechanism that uses another member instead of the rod lens 25. In the following embodiments, a pressing mechanism will be mainly described. Excluding the pressing mechanism 35, descriptions on the same structures as those of the 3-D stereolithography apparatus 100 will be simplified or omitted.

Figure 7:
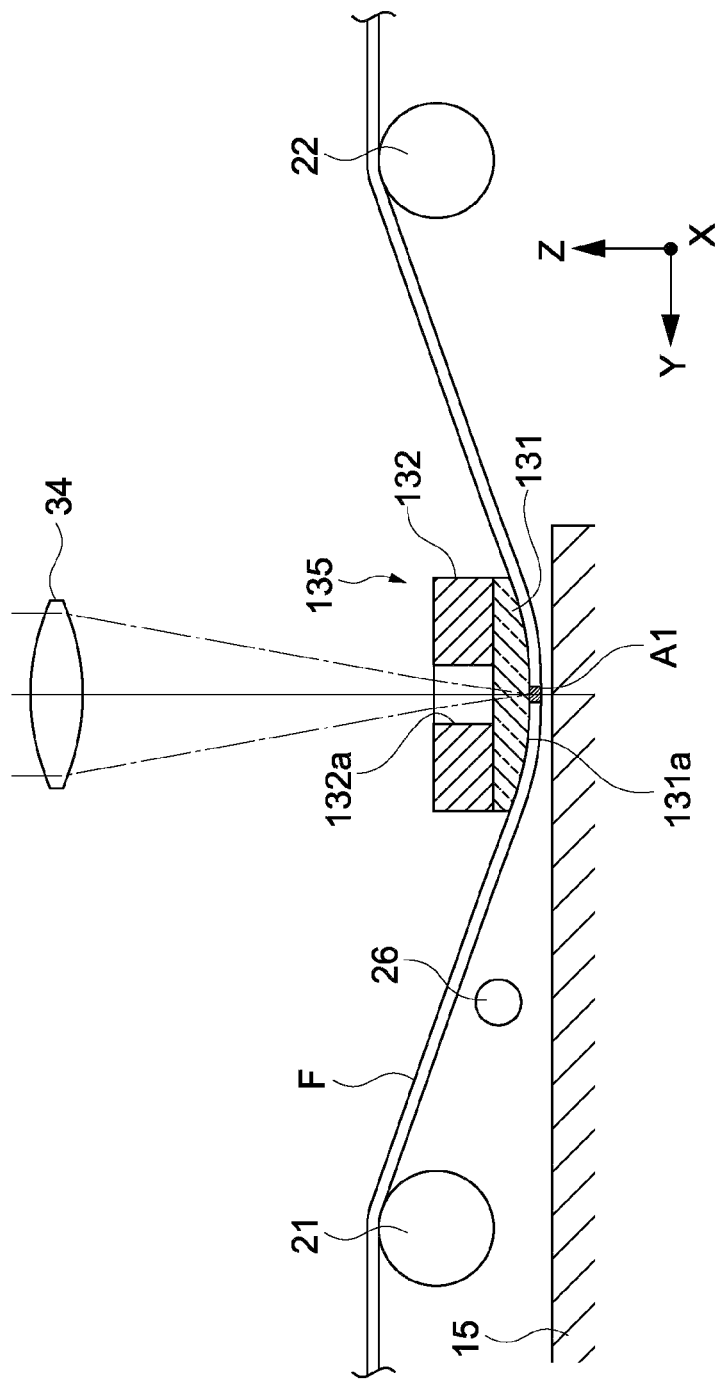
FIG. 7 is a cross-sectional view showing a pressing mechanism according to a second embodiment of the present invention.

A pressing mechanism 135 shown in FIG. 7 includes a cylindrical lens 131 and a support member 132 that reinforces and supports the cylindrical lens. The cylindrical lens 131 has a cylindrical surface 131a that is in contact with the film F. The support member 132 is provided on a surface opposite to the cylindrical surface 131a, and has a slit 132a for forming an optical path of the laser light.

The cylindrical lens 131 and the support member 132 each have a shape elongated in the X-axis direction and are attached to the sidewalls 2 as in the 3-D stereolithography apparatus 100 according to the first embodiment, but are not rotated unlike the rod lens 25. The slit 132a of the support member 132 is formed into a shape elongated in the X-axis direction. A right member and a left member of the support member 132 in the figure are integrally fixed in position with a fixation member (not shown) on longitudinal both ends of the support member 132.

The cylindrical surface 131a of the cylindrical lens 131 presses the film F, thereby forming, in the film F, the linear area A1 that is closest to the modeling stage 15.

With the pressing mechanism 135 as described above, the thickness of the cylindrical lens 131 in the optical axis direction can be reduced as compared to the rod lens 25, with the result that a numerical aperture (NA) can be increased. Thus, the spot diameter of the laser beam can be reduced, and the resolution of the exposure is increased. As a result, the 3-D object can be formed with high accuracy.

The thickness of the cylindrical lens 131 on the optical axis is set to 4 to 5 mm, but is not limited to this range.

Further, in the pressing mechanism 135, a friction force acts between the film F and the cylindrical lens 131. In view of this, a mechanism that supplies a lubricating liquid therebetween may be provided. In this case, a nozzle for supplying the lubricating liquid to a surface of the film F may be provided in a position opposed to the supplying nozzle 26 with the film F being sandwiched, for example.

Further, for example, in the case of using a lubricating liquid having substantially the same refractive index as the cylindrical lens 131, it is possible to reduce reflection of the laser light on an interface between the cylindrical lens 131 and the film F.

(Third Embodiment)

Figure 8:
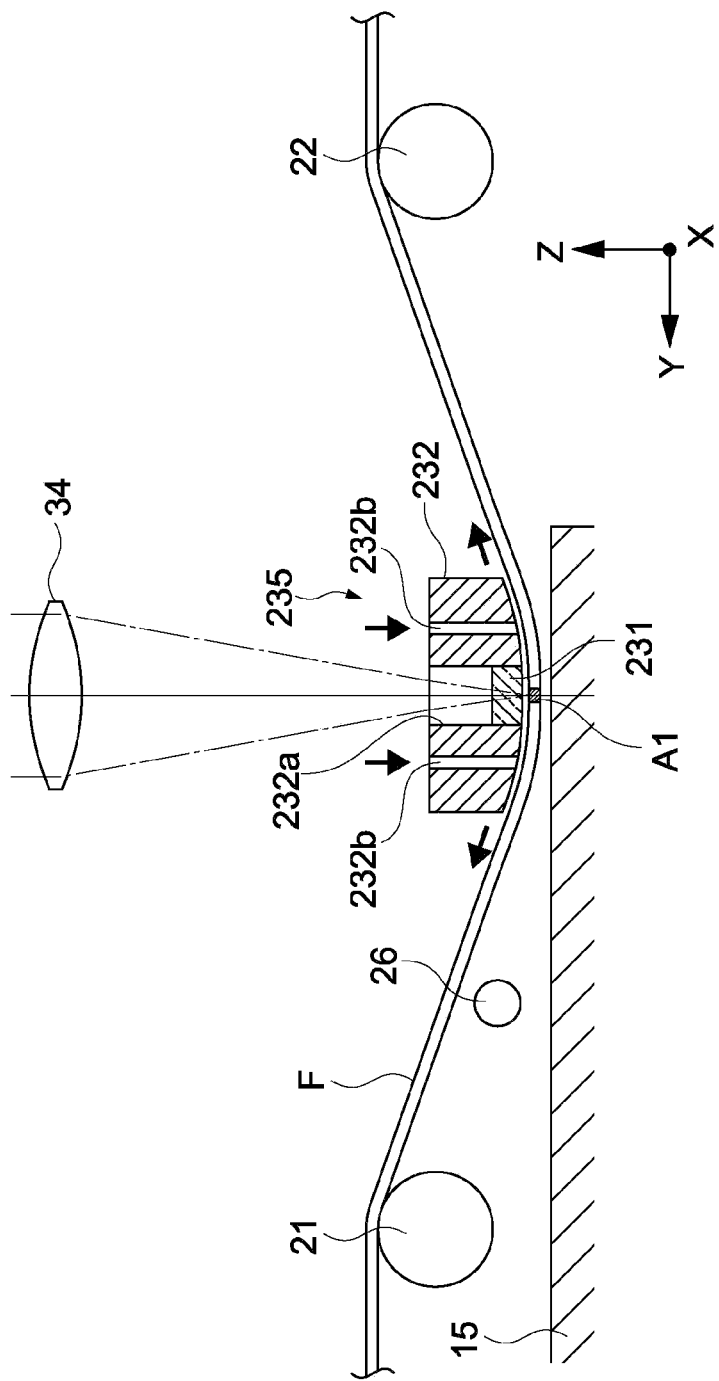
FIG. 8 is a cross-sectional view showing a pressing mechanism according to a third embodiment of the present invention.

FIG. 8 is a cross-sectional view showing a pressing mechanism according to a third embodiment.

A support member 232 of a pressing mechanism 235 according to this embodiment includes a slit 232a for forming an optical path and a cylindrical lens 231 disposed in the slit 232a. In addition, the support member 232 includes a flow path 232b that introduces compressed air between the support member 232 and the film F and between the cylindrical lens 231 and the film F. The flow path 232b is disposed on both sides of the slit 232a, for example. The flow path 232b may have a slit shape elongated in the X-axis direction or may be a plurality of through holes arranged in the X-axis direction. The flow path 232b is connected to a supply source (not shown) of the compressed air, which has a pipe.

As in the second embodiment, the support member 232, the slit 232a, and the cylindrical lens 231 each have the elongated shape in the X-axis direction.

The cylindrical surface of the cylindrical lens 231, which is in contact with the film F, is a curved surface that is continuous with a curved surface of the support member 232, which is in contact with the film F. That is, the curvatures of those curved surfaces are set to be substantially equal to each other. When the cylindrical lens 231 and the support member press the film F, the linear area A1 closest to the modeling stage 15 is formed in the film F.

In this embodiment, the compressed air introduced from the flow path 232b of the support member 232 is ejected toward the film F, passes between the pressing mechanism 235 and the film F, and is discharged to the outside from both sides of the pressing mechanism 235 in the Y-axis direction. That is, the compressed air functions as a cushion to prevent the film F from being in contact with the pressing mechanism 235, with the result that the friction force generated therebetween can be significantly reduced.

In addition, by adjusting the pressure of the compressed air and the quantity of the flowing air, the tension of the film F can be adjusted, and thus the thickness of the cured layer of the resin liquid R can be controlled with high accuracy.

(Fourth Embodiment)

Figure 9:
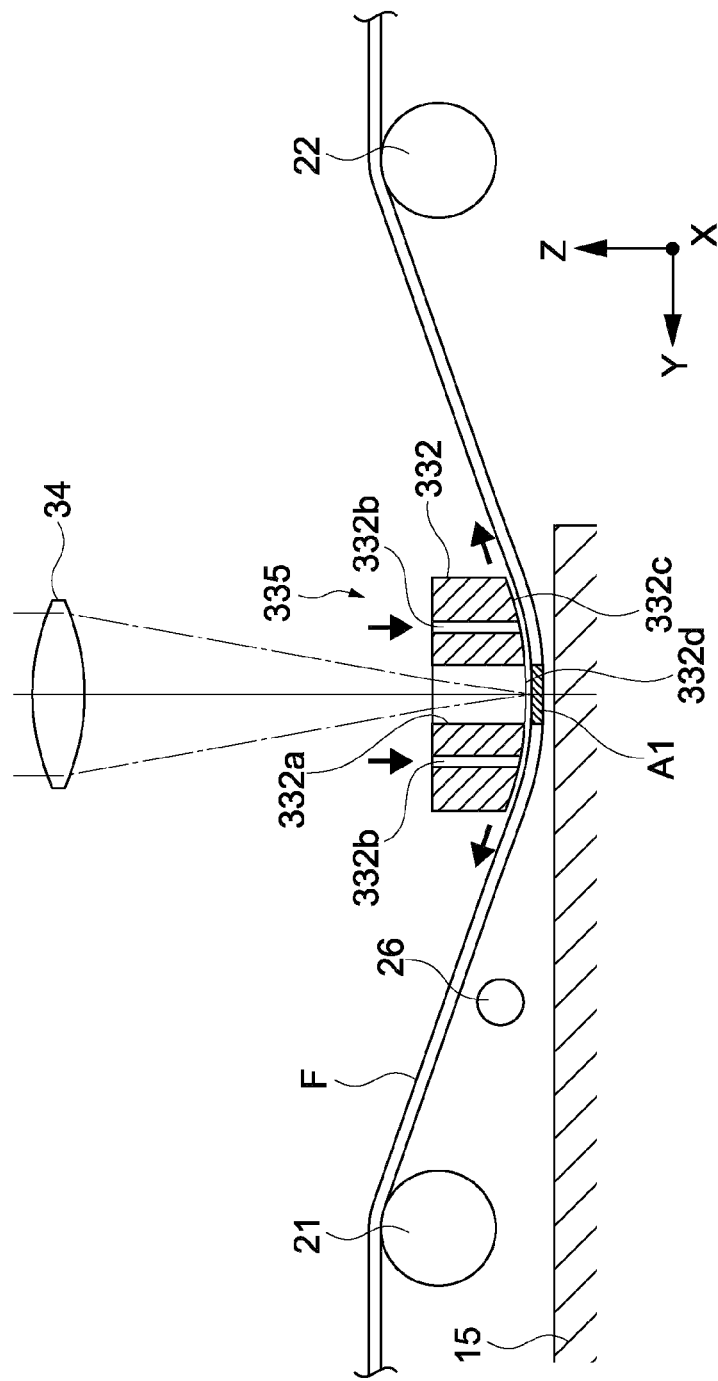
FIG. 9 is a cross-sectional view showing a pressing mechanism according to a fourth embodiment of the present invention.

FIG. 9 is a cross-sectional view showing a pressing mechanism according to a fourth embodiment.

A pressing mechanism 335 has the structure without the cylindrical lens 231 of the pressing mechanism 235 shown in FIG. 8. That is, a tension member 332 of the pressing mechanism 335 includes an optical path of the laser light, a slit 332a, and flow paths 332b of the compressed air. The slit 332a is formed into a shape elongated in the x-axis direction for forming the optical path.

Surfaces 332c of the tension member 332 that are opposed to the film F are each formed into a curved surface (for example, cylindrical surface). In continuous with the curved surface, an opening surface 332d of the slit 332a is formed. The opening surface 332d is a surface for forming the linear area A1 in the film F. The surface is a flat surface, so the linear area A1 also becomes a flat area.

When the film F is subjected to a tension with the pressing mechanism 335, a curved area is formed on the film F by the surfaces 332c of the tension member 332, and the flat area is formed on the film F in continuous with the curved area.

In this embodiment, since the laser light does not pass through a lens, there is no refraction of the laser light. Therefore, the shape of the spot of the laser beam that exits the objective lens 34 is not changed, which can increase the resolution of the exposure.

It should be noted that the compressed air may not necessarily be used in this embodiment.

(Fifth Embodiment)

Figure 10:
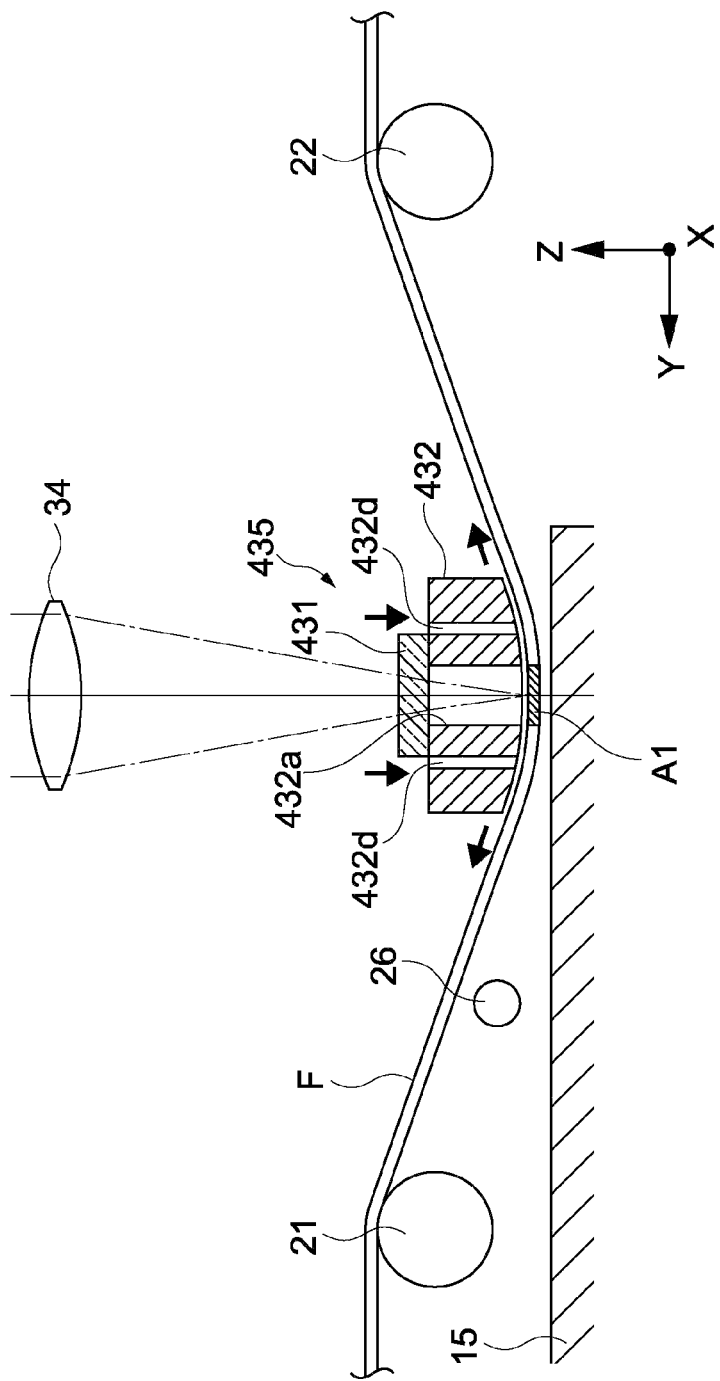
FIG. 10 is a cross-sectional view showing a pressing mechanism according to a fifth embodiment of the present invention.

FIG. 10 is a cross-sectional view showing a pressing mechanism according to a fifth embodiment.

A pressing mechanism 435 includes a tension member 432 and a light-transmissive cover 431. The tension member 432 is similar to the tension member 332 shown in FIG. 9. The cover 431 blocks an upper opening of a slit 432a of the tension member 432. The cover 431 is used for depressurizing the inside of the slit 432a. A pressure control mechanism (not shown) for depressurizing the inside of the slit 432a is connected thereto. As the pressure control mechanism, used is a mechanism including at least a vacuum pump necessary for depressurizing the inside of the slit 432a, for example.

As described above, by depressurizing the inside of the slit 432a, it is possible to control the vacuum so as to counteract the contraction force of the resin liquid R cured between the linear area A1 of the film F and the modeling stage 15. In other words, it is possible to apply, to the film F, a force in an opposite direction to the force that pulls the film F downwards due to the contraction force of the resin liquid R. As a result, the flatness of the linear area A1 of the film F can be increased, and therefore the thickness of the cured layer can be controlled with high accuracy.

The present invention is not limited to the above embodiments, and various other embodiments are possible.

The light-curing material R is not limited to the UV-curing resin, and may be a material that is cured by visible light or infrared light. That is, any light-curing material R may be used, as long as the material is cured by irradiation with a predetermined light energy of a predetermined wavelength range. In this case, of course, the wavelength range of the laser light source 31 is selected as appropriate in accordance with the kind of the light-curing material R.

The structure of the X-axis movement mechanism 60 for performing scanning with the laser light in the X-axis direction is not limited to that of the above embodiments. For example, an optical scanning mechanism using a galvano scanner, a polygon mirror, or the like may be used. In the case of using the optical scanning mechanism that uses the galvano scanner, the polygon mirror, or the like, it is possible to perform a high-speed scanning as compared to the case of using the X-axis movement mechanism 60 and perform a high-speed exposure process. However, in such an optical scanning mechanism, to obtain substantially the same exposure resolution as in the X-axis movement mechanism 60, a more complicated optical design has to be used.

The outline of the cross-section of the part of the lens in contact with the film F is not limited to the cylindrical surface 131*a* of the cylindrical lens 131 shown in FIG. 7, and may be a part of an oval or a hyperbolic curve.

In the above embodiments, by the movement of the movement base 11, the film F and the modeling stage 15 are integrally moved. Alternatively, in the state where the film F and the modeling stage 15 are stopped with respect to the base 1, the sidewalls 2 may be moved, and the rod lens 25 and the like may be moved in the Y-axis direction. Alternatively, at least one of the film F, the modeling stage 15, and the sidewalls 2 may be moved.

The modeling stage 15 is not limited to be disposed so that the surface thereof is horizontal. Alternatively, the modeling stage 15 may be disposed along a vertical surface in the Z-axis direction or along a tilted surface. Alternatively, the modeling stage may be disposed so that the surface of the modeling stage on which the modeled layers are stacked is faced downwards. In those cases, it is only necessary to support the film F so as to be opposed to the modeling stage in accordance with the position of the modeling stage.

The position of the supplying nozzle 26 is not limited to that in the above embodiments. Any position may be possible, as long as the resin liquid R is supplied into the slit area S.

Instead of the mode in which the X-axis direction, which is the longitudinal direction of the linear area formed along the X-axis, and the Y-axis direction, which is the movement direction of the modeling stage 15 and the film F, are perpendicular to each other, those directions may be crossed at a slant.

The present application contains subject matter related to that disclosed in Japanese Priority Patent Application JP 2009-253948 filed in the Japan Patent Office on Nov. 5, 2009, the entire content of which is hereby incorporated by reference.

What is claimed is:

1. A three-dimensional stereolithography apparatus, comprising:
   a stage; a film;
   a support mechanism operable to support the film so that the film is opposed to the stage;
   a pressing mechanism having a lens disposed at least partially in the pressing mechanism, the pressing mechanism operable to press at least a linear area of the film supported by the support mechanism so that the linear area that is opposed to and closest to the stage is formed in the film, the linear area being formed in a first direction;
   a supply mechanism operable to supply a light-curing material into a slit area formed between the stage and the linear area of the film;
   an irradiation unit operable irradiate the light-curing material supplied into the slit area by the supply mechanism with laser light through the pressing mechanism and the film;
   a movement mechanism operable (i) to move the stage and the pressing mechanism relatively to the film in a second direction, and (ii) to form one cured layer of the light-curing material, the second direction being different from the first direction; and
   a control mechanism operable (i) to control a distance between the stage and the linear area of the film, and (ii) to stack the cured layer of the light-curing material.

2. The three-dimensional stereolithography apparatus according to claim 1,
   wherein the pressing mechanism is configured to press the film so that a curved area including the linear area is formed in the film.

3. The three-dimensional stereolithography apparatus according to claim 2,
   wherein the lens has a curved surface corresponding to a shape of the curved area.

4. The three-dimensional stereolithography apparatus according to claim 3,
   wherein the lens is a rod lens.

5. The three-dimensional stereolithography apparatus according to claim 4,
   wherein the rod lens is provided rotatably about an axis extended in the first direction.

6. The three-dimensional stereolithography apparatus according to claim 4, further comprising:
   a correction lens to correct a shape of a beam spot of the laser light with which the light-curing material is irradiated.

7. The three-dimensional stereolithography apparatus according to claim 3,
   wherein the lens is a cylindrical lens having a cylindrical surface as the curved surface.

8. The three-dimensional stereolithography apparatus according to claim 1,
   wherein the pressing mechanism presses the film so that a flat area including the linear area and a curved area provided in continuous with the flat area are formed on the film.

9. The three-dimensional stereolithography apparatus according to claim 8,
   wherein the pressing mechanism includes
      an optical path of the laser light,
      a slit having an opening surface corresponding to a shape of the flat area, the optical path being formed in the slit, and
      a curved surface that is provided in continuous with the opening surface, and corresponds to a shape of the curved area.

10. The three-dimensional stereolithography apparatus according to claim 9,
    wherein the pressing mechanism further includes a flow path that introduces a gas into a gap between the film and the opening surface and curved surface.

11. The three-dimensional stereolithography apparatus according to claim 9, further comprising:
    a pressure control mechanism to control a pressure in the slit.

12. The three-dimensional stereolithography apparatus according to claim 1, further comprising:
    a scanning mechanism to perform relative scanning with respect to the pressing mechanism and the stage with the laser light in the first direction.

13. The three-dimensional stereolithography apparatus according to claim 1,
    wherein the movement mechanism integrally moves the stage and the film relatively to the pressing mechanism.

14. A three-dimensional stereolithography apparatus, comprising:
    a stage; a film;

a support mechanism operable to support the film so that the film is opposed to the stage;

a pressing mechanism operable to press at least a linear area of the film supported by the support mechanism so that the linear area that is opposed to and closest to the stage is formed in the film, the linear area being formed in a first direction;

a supply mechanism operable to supply a light-curing material into a slit area formed between the stage and the linear area of the film;

an irradiation unit operable to irradiate the light-curing material supplied into the slit area by the supply mechanism with laser light through the pressing mechanism and the film;

a movement mechanism operable (i) to move the stage and the pressing mechanism relatively to the film in a second direction, and (ii) to form one cured layer of the light-curing material, the second direction being different from the first direction; and a control mechanism operable (i) to control a distance between the stage and the linear area of the film, and (ii) to stack the cured layer of the light-curing material, wherein, the pressing mechanism is configured to press the film so that a curved area including the linear area is formed in the film, the pressing mechanism includes a light-transmissive member having a curved surface corresponding to a shape of the curved area, the pressing mechanism includes a support member operable to support the light-transmissive member, and the support member includes (i) a curved surface continuous with the curved surface of the light-transmissive member to form the curved area of the film, and (ii) flow path operable to introduce a gas into a gap between the film and the curved surfaces of the light-transmissive member and the support member.

* * * * *